(12) United States Patent
Tokura et al.

(10) Patent No.: US 10,066,739 B2
(45) Date of Patent: Sep. 4, 2018

(54) SHIFT CONTROL DEVICE AND METHOD OF CONTROLLING SHIFT CONTROL DEVICE

(71) Applicants: Takaaki Tokura, Nagoya (JP); Hideaki Otsubo, Aichi-gun (JP)

(72) Inventors: Takaaki Tokura, Nagoya (JP); Hideaki Otsubo, Aichi-gun (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 388 days.

(21) Appl. No.: 14/778,903

(22) PCT Filed: Mar. 28, 2014

(86) PCT No.: PCT/IB2014/000442
§ 371 (c)(1),
(2) Date: Sep. 21, 2015

(87) PCT Pub. No.: WO2014/162188
PCT Pub. Date: Oct. 9, 2014

(65) Prior Publication Data
US 2016/0047464 A1    Feb. 18, 2016

(30) Foreign Application Priority Data
Apr. 3, 2013    (JP) ................. 2013-077735

(51) Int. Cl.
*F16H 61/02*    (2006.01)
*F16H 61/00*    (2006.01)

(52) U.S. Cl.
CPC .. *F16H 61/0213* (2013.01); *F16H 2061/0015* (2013.01); *F16H 2061/022* (2013.01); *F16H 2061/0216* (2013.01)

(58) Field of Classification Search
CPC ..... F16H 2061/0015; F16H 2061/0216; F16H 2061/022; F16H 61/0213
See application file for complete search history.

(56) References Cited

FOREIGN PATENT DOCUMENTS

| JP | 02240448 A | * | 9/1990 |
|---|---|---|---|
| JP | H05-263904 A | | 10/1993 |
| JP | 2806545 B2 | | 9/1998 |
| JP | 2006-336716 A | | 12/2006 |
| WO | 2010/092681 A1 | | 8/2010 |

* cited by examiner

*Primary Examiner* — Erin D Bishop
(74) *Attorney, Agent, or Firm* — Oliff PLC

(57) ABSTRACT

Every time a specified time ΔT elapses, this shift control device calculates a target drive force Fd (a step S5), calculates a absolute value AF of a difference between an optimum fuel consumption rate Fopt [Fd] for the target drive force Fd and a fuel consumption rate FN [Fd] for the target drive force Fd in each of the gear stages N (a step S8), determines candidate gear stages Nc from the gear stages N (as step S13), and integrates the absolute value AF that is calculated for each of the candidate gear stages Nc in a period from last shift to the present time to determine the candidate gear stage Nc for which an integrated value J is the smallest as a target gear stage Nm (a step S15).

5 Claims, 2 Drawing Sheets

SHIFT CONTROL DEVICE AND METHOD OF CONTROLLING SHIFT CONTROL DEVICE

BACKGROUND OF THE INVENTION

1. Field of the Invention

The present invention relates to a shift control device for controlling an automatic transmission that automatically shifts rotary power of an engine and to a method of controlling a shift control device.

2. Description of Related Art

Japanese Patent Application Publication No. 2006-336716 (JP 2006-336716 A) discloses a shift control device that includes: a basic shift control means for shifting a gear stage of a transmission of a vehicle to a gear stage in which a fuel consumption rate is the lowest within a range that the vehicle is not decelerated; and a shift inhibiting means for inhibiting an upshift by the basic shift control means for a specified time since an accelerator operation amount of the vehicle exceeds a specified amount and is then reduced.

The shift control device calculates currently required engine output, determines a hypothetical fuel consumption rate and hypothetical required torque in a case where the required engine output is maintained, and, among the gear stages in which the hypothetical required torque corresponds to the maximum torque or smaller, selects the gear stage with the lowest hypothetical fuel consumption rate as a target gear stage. In other words, the target gear stage is selected as a gear stage in which the current hypothetical fuel consumption rate is the lowest.

SUMMARY OF THE INVENTION

In JP 2006-336716 A, the target gear stage is selected as the gear stage in which the current hypothetical fuel consumption rate is the lowest. In other words, the target gear stage is selected only in consideration of the current hypothetical fuel consumption rate.

Thus, in a case where the accelerator operation amount is temporarily changed to a large value (that is, in a case where the accelerator operation amount immediately returns to an original value), the hypothetical fuel consumption rate at a time when the accelerator operation amount is substantially changed is used as the current hypothetical fuel consumption rate to select the target gear stage, but the accelerator operation amount immediately returns to the original value thereafter. In this case, once the accelerator operation amount returns to the original value, the target gear stage that is selected at the time when the accelerator operation amount is substantially changed is no longer the gear stage in which the hypothetical fuel consumption rate is the lowest. As a result, the fuel consumption rate is degraded.

In JP 2006-336716 A, an upshift is inhibited for a specified time since the last shift. Thus, even when a drive force becomes necessary within the specified time since the last shift, shifting is inhibited, and drivability is thereby degraded.

The present invention provides a shift control device that can maintain favorable fuel consumption performance even when an accelerator operation amount is temporarily and substantially changed.

A first aspect of the present invention relates to a shift control device. The shift control device includes an electronic control unit. The electronic control unit is configured to: (a) determine a target gear stage; (b) set a gear stage of an automatic transmission that automatically shifts a rotational speed of an engine to the target gear stage; (c) calculate a target drive force every time a specified time elapses; (d) calculate an absolute value of a difference between an optimum fuel consumption rate for the target drive force and a fuel consumption rate for the target drive force in each of the gear stages; (e) determine candidate gear stages from the gear stages; (f) integrate the absolute value that is calculated for each of the candidate gear stages in a period from last shift to the present time to calculate an integrated value; and (g) determine the candidate gear stage for which the integrated value is the smallest as the target gear stage.

According to the above configuration, every time the specified time elapses, the target drive force is calculated, the difference absolute value between the optimum fuel consumption rate for the target drive force and the fuel consumption rate for the target drive force in each of the gear stages (that is, an excess fuel consumption rate from the optimum fuel consumption rate in each of the gear stages) is calculated, the candidate gear stages are determined from the gear stages, the difference absolute value that is calculated for each of the candidate gear stages in the period from the last shift to the present time is integrated, and the candidate gear stage in which the integrated value is the smallest (that is, the candidate gear stage in which the integrated value of the excess fuel consumption rate is the smallest) is determined as the target gear stage. In other words, the candidate gear stage in which the integrated value of the difference absolute value calculated in the period from the last shift to the present time is the smallest is determined as the target gear stage.

As described above, in the first aspect of the present invention, not only the current difference absolute value (that corresponds to a hypothetical fuel consumption rate of related art) but the integrated value of the difference absolute value that is calculated in the period from the last shift to the present time is also considered. Accordingly, when an accelerator operation amount is temporarily increased to a large value (that is, when the accelerator operation amount immediately returns to an original value), the integrated value is not substantially changed. Thus, the target gear stage in this case (when the accelerator operation amount is temporarily increased to the large value) is likely to be a gear stage that is the same as (or near) the target gear stage before the accelerator operation amount is temporarily increased to the large value. This can suppress degradation of the fuel consumption rate when the accelerator operation amount returns to the original value. Therefore, it is possible to maintain favorable fuel consumption performance even when the accelerator operation amount is temporarily and substantially changed.

In the shift control device, the electronic control unit may set a shift suppression coefficient for each of the gear stages. The electronic control unit may set the shift suppression coefficient for each of the gear stages to a first value when the gear stage and a currently selected gear stage are identical, and may set the shift suppression coefficient for each of the gear stages to a second value that is larger than the first value when the gear stage and the currently selected gear stage are not identical. The electronic control unit may multiply the shift suppression coefficient by an inverse of an elapsed time from the last shift to calculate a shift suppression term. The electronic control unit may calculate a first multiplication value by multiplying a first weighting coefficient by the absolute value, calculate the shift suppression term to multiply a second weighting coefficient by the shift suppression term and to calculate a second multiplication value, and calculate a sum of the first multiplication value and the second multiplication value for each of the gear stages every time the specified time elapses. The electronic control unit may integrate the sum that is calculated for each of the candidate gear stages in the period from the last shift to the present time to calculate an integrated value. The electronic control unit may determine the candidate gear stage for which the integrated value is the smallest as the target gear stage.

According to the above configuration, the shift suppression coefficient for each of the gear stages takes a first value when the gear stage corresponds to the currently selected gear stage, and takes the second value that is larger than the first value when the gear stage does not correspond to the currently selected gear stage. Accordingly, the shift suppression term for the currently selected gear stage becomes smaller than the shift suppression terms for the gear stages other than the currently selected gear stage. Thus, the integrated value for the currently selected gear stage is likely to be the smallest, and the currently selected gear stage is likely to be determined as the target gear stage (that is, the shifting is suppressed).

It should be noted that the suppression of shifting does not inhibit shifting, but rather, tends to prevent easy shifting. Thus, compared to related art that inhibits shifting for a specified period from the last shift, it is possible to suppress degradation of drivability.

In addition, because the shift suppression term for each of the gear stages is reduced along with a lapse of time from the last shift, the tendency of the currently selected gear stage to be determined as the target gear stage (that is, the suppression is shifting) is lowered. Accordingly, it is possible to suppress frequent shifting immediately after shifting and is also possible to achieve a feeling of acceleration in a sport drive mode.

Furthermore, the first multiplication value is calculated by multiplying the first weighting coefficient by the difference absolute value, and the second multiplication value is calculated by multiplying the second weighting coefficient by the shift suppression term. Accordingly, by appropriately adjusting a magnitude relationship between the first weighting coefficient and the second weighting coefficient, the difference absolute value (that is, the fuel economy) can be emphasized or the shift suppression term (that is, the suppression of shifting) can be emphasized when the target gear stage is determined.

In the shift control device, the electronic control unit may set such that each of the first weighting coefficient and the second weighting coefficient depends on at least one of a vehicle speed and drive power.

According to the above configuration, because each of the first weighting coefficient and the second weighting coefficient depends on at least one of the vehicle speed and the drive power (a product of the vehicle speed and the drive force of a drive wheel) (that is, a traveling state of the vehicle), it is possible to adjust the magnitude relationship between the first weighting coefficient and the second weighting coefficient corresponding to a traveling state of the vehicle.

In the shift control device, the electronic control unit may set such that the second weighting coefficient becomes larger than the first weighting coefficient as the drive power is larger.

According to the above configuration, the second weighting coefficient becomes larger than the first weighting coefficient as the drive power is larger. In other words, because it can be determined that the vehicle travels in the sport drive mode rather than in a fuel economy drive mode in a range of the large drive power, in this case, the suppression of the frequent shifting and the feeling of acceleration can be more emphasized than the fuel economy. On the other hand, in a range of the small drive power, because it can be determined that the vehicle travels in the fuel economy drive mode rather than in the sport drive mode, in this case, the fuel economy can be more emphasized than the suppression of the frequent shifting and the feeling of acceleration.

The shift control device of the first aspect of the present invention provides a shift control device that can maintain the favorable fuel consumption performance even when the accelerator operation amount is temporarily and substantially changed.

A second aspect of the present invention relates to a method of controlling a shift control device that includes an electronic control unit. The method includes: determining a target gear stage by the electronic control unit; setting a gear stage of an automatic transmission that automatically shifts a rotational speed of an engine to the target gear stage by the electronic control unit; calculating a target drive force by the electronic control unit every time a specified time elapses; calculating an absolute value of a difference between an optimum fuel consumption rate for the target drive force and a fuel consumption rate for the target drive force in each of the gear stages by the electronic control unit; determining candidate gear stages from the gear stages by the electronic control unit, integrating the absolute value that is calculated for each of the candidate gear stages in a period from last shift to the present time to calculate an integrated value by the electronic control unit, and determining the candidate gear stage for which the integrated value is the smallest as the target gear stage by the electronic control unit.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

A detailed description will hereinafter be made on an embodiment of the present invention with the accompanying drawings.

<Description of Configuration>

Figure 1:
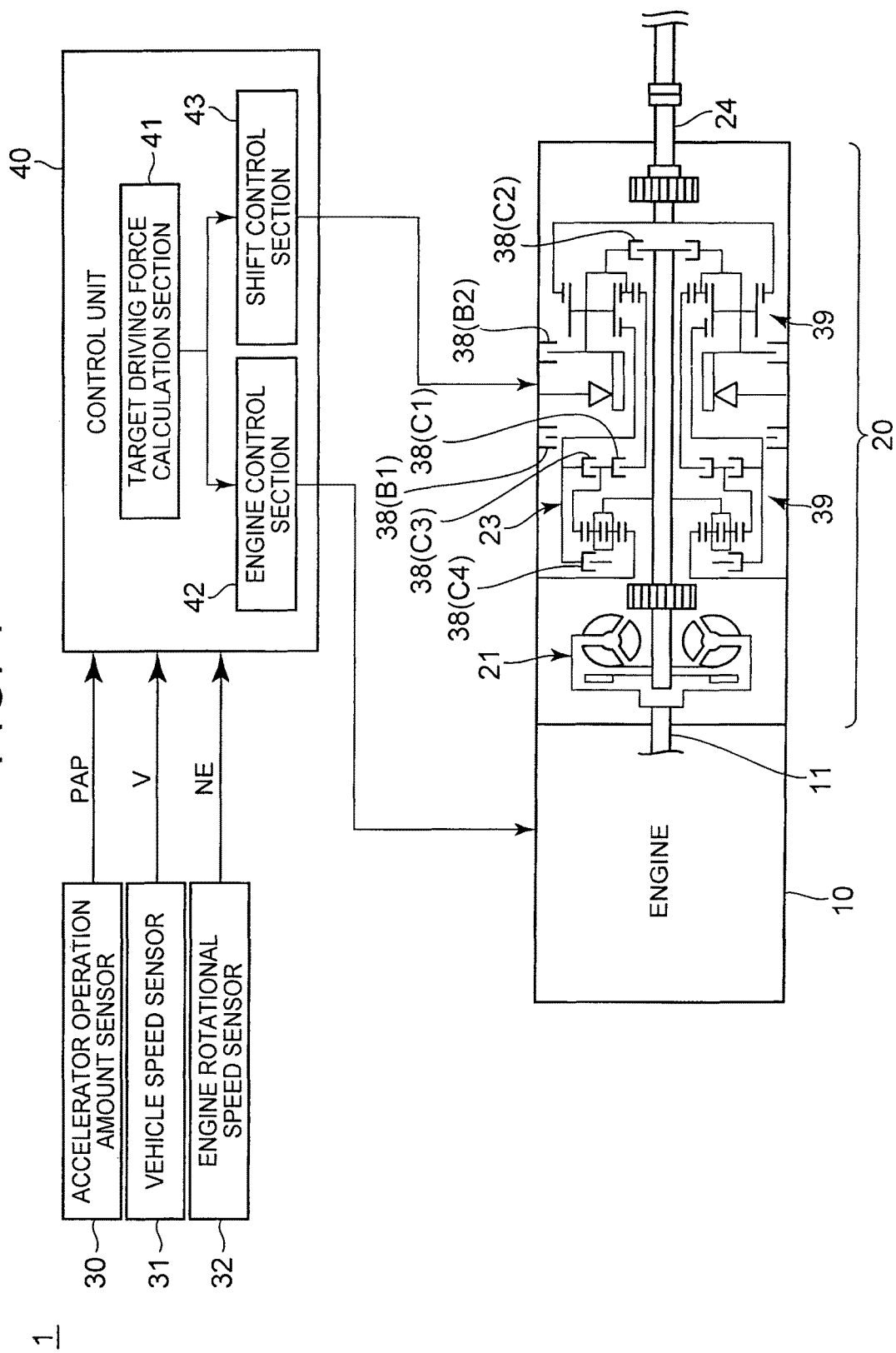
FIG. 1 is a schematic configuration diagram of a shift control device according to an embodiment of the present invention.

FIG. 1 is a schematic configuration diagram of a shift control device according to this embodiment.

As shown in FIG. 1, a shift control device, 1 according to this embodiment controls an automatic transmission 20 that automatically shifts rotary power of an automobile engine 10, for example. Every time a specified time AT elapses, the shift control device 1 calculates, for each gear stage N, a difference absolute value (an absolute value of a difference) ΔF that is an excess fuel consumption rate from an optimum fuel consumption rate Fopt [Fd] for a target drive force Fd and a shift suppression term S for suppressing shifting immediately after the last shift, weights and sums the difference absolute value ΔF and the shift suppression term S (a sum Ja), integrates the sum Ja that is calculated in a period from the last shift to a present time (an integrated value J) for each of candidate gear stages Nc, and, determines the candidate gear stage Nc in which the integrated value J is the smallest as a target gear stage Nm.

The shift control device 1 includes the engine 10, the automatic transmission 20, various sensors 30, 31, 32, and a control unit (electronic control unit) 40 for controlling the engine 10 and the automatic transmission 20 on the basis of detected values of the various sensors 30, 31, 32.

The engine 10 is a drive source such as a gasoline engine or a diesel engine that generates the rotary power for traveling by fuel combustion. The rotary power generated in the engine 10 is output to the automatic transmission 20 from an output shaft 11 of the engine 10.

The automatic transmission 20 includes a torque converter 21 that transmits the rotary power output from the engine 10 via hydraulic oil and a shift device 23 that shifts the rotary power output from the torque converter 21.

The shift device 23 is a multistage shift device that is configured by combining plural planetary gear trains 39 and plural frictional engagement elements (each of clutches C1, C2, C3, C4 and each of brakes B1, B2) 38. Each of the brakes B1, B2 is the frictional engagement element 38 that connects and disconnects (that is, connects and cuts) a coupling state between a rotating element of the each planetary gear train 39 (a carrier, a ring gear, a sun gear, or the like) and a housing of the shift device 23. Each of the clutches C1, C2, C3, C4 is the frictional engagement element 38 that connects and disconnects power transmission between the rotating elements of the each planetary gear train 39.

The shift device 23 has the plural gear stages N that are formed by a combination of a connected or disconnected state of the each frictional engagement element 38. N represents arbitrary gear stage of a forward first gear to a forward sixth gear, for example. The shift device 23 switches the combination of the connected or disconnected state of the each frictional engagement element 38 according to the control by the control unit 40 to select one gear stage Np from the plural gear stages N, and transmits the rotary power output from the torque converter 21 in the selected gear stage (currently selected gear stage) Np to output it from an output shaft 24. Accordingly, the rotary power output from the engine 10 is shifted at a shift ratio (=a rotational speed of the rotary power input to the shift device 23/a rotational speed of the rotary power output from the shift device 23) that corresponds to the gear stage Np selected in the automatic transmission 20, and is output from the output shaft 24. Here, the rotary power output from the output shaft 24 is output to a drive wheel (not shown) side via a differential gear (not shown) and the like.

The various sensors 30, 31, 32 include an accelerator operation amount sensor 30 for detecting an accelerator operation amount (that is, accelerator pedal depressing amount) PAP of the vehicle, a vehicle speed sensor 31 for detecting a vehicle speed V of the vehicle, and an engine rotational speed sensor 32 for detecting an engine rotational speed (a rotational speed of the output shaft 11) NE of the engine 10. The detected values PAP, V, NE of the various sensors 30, 31, 32 are output to the control unit 40.

The control unit 40 includes a target drive force calculation section 41 that calculates the target drive force Fd, an engine control section 42 that controls the rotary power output from the engine 10 on the basis of the target drive force Fd, and a shift control section 43 that controls to shift the automatic transmission 20 on the basis of the target drive force Fd.

The target drive force calculation section 41 calculates the target drive force Fd on the basis of an acceleration requesting operation by a driver (an accelerator pedal depressing operation, for example). More specifically, the target drive force calculation section 41 obtains a requested drive force Fd* by applying the accelerator operation amount PAP and the vehicle speed V to a requested drive force map that is set in advance, and calculates the target drive force Fd on the basis of the requested drive force Fd* (Fd=Fd*, for example). The target drive force calculation section 41 calculates the target drive force Fd every time the specified time ΔT elapses, for example.

The requested drive force map is a map that defines a relationship among the accelerator operation amount PAP, the vehicle speed V, and the requested drive force Fd* and is set such that the requested drive force Fd* is increased along with an increase in the accelerator operation amount PAP and/or that the requested drive force Fd* is reduced along with an increase in the vehicle speed V, for example.

The engine control section 42 calculates target engine torque on the basis of the target drive force Fd and controls the rotary power output from the engine 10 such that the output torque of the engine 10 corresponds to the target engine torque (that is, controls ignition timing, an intake air amount, a fuel injection amount, and the like).

The shift control section 43 determines the target gear stage Nm on the basis of the target drive force Fd and shifts the currently selected gear stage Np of the automatic transmission 20 to the target gear stage Nm.

More specifically, every time the specified time ΔT elapses, the shift control section 43 (a) calculates an optimum fuel consumption rate Fopt [Fd] of the engine 10 for the target drive force Fd (that is, a fuel consumption rate in a case where the target drive force Fd is achieved on an optimum fuel consumption line), (b) calculates a fuel consumption rate FN [Fd] of the engine 10 for the target drive force Fd in each of the gear stages N (that is, a fuel consumption rate in a case where the target drive force Fd is achieved in each of the gear stages N), and (c) calculates the difference absolute value ΔF between the above rates (=|Fopt [Fd]—FN [Fd]|) for each of the gear stages N.

It should be noted that the difference absolute value ΔF in the gear stage N indicates an excess fuel consumption rate from the optimum fuel consumption rate Fopt [Fd] in a case where the currently selected gear stage Np is shifted to the gear stage N.

In the above (a), the shift control section 43 applies the target drive force Fd to an optimum fuel consumption rate map (that is, a map that defines a corresponding relationship between the target drive force Fd and the optimum fuel consumption rate Fopt [Fd]) that is set in advance, for example, and obtains the optimum fuel consumption rate Fopt [Fd].

In the above (b), based on the currently selected gear stage Np, the current engine rotational speed, and a gear ratio between each two of the gear stages, for example, the shift control section 43 calculates a hypothetical engine rotational speed in each of the gear stages N in a case where the gear stage is shifted to each of the gear stages N. Then, the shift control section 43 uses an iso-horsepower chart or the like, for example, to determine, for each of the gear stages N, the required engine torque that is required to achieve the target drive force Fd at the hypothetical engine rotational speed. Next, the shift control section 43 uses an iso-fuel-consumption chart or the like, for example, to determine the fuel consumption rate FN [Fd] for the target drive force Fd in each of the gear stages N on the basis of the hypothetical engine rotational speed and the required engine torque in each of the gear stages N.

In addition, a shift suppression coefficient K is set for each of the gear stages N in the shift control section 43. The shift suppression coefficient K for each of the gear stages N takes a first value when the gear stage N corresponds to the currently selected gear stage (that is, the gear stage selected in the last shift) Np (when the gear stage N and the currently selected gear stage Np are identical), and takes a second value that is larger than the first value when the gear stage does not correspond to the currently selected gear stage Np (when the gear stage and the currently selected gear stage Np are not identical).

Furthermore, the shift control section 43 measures an elapsed time T from the last shift and multiplies the shift suppression coefficient K by an inverse of the elapsed time T ($=Tn=\Delta T \times n$: n is an integer) from the last shift to calculate the shift suppression term S ($=K/(\Delta T \times n)$) for each of the gear stages N every time the specified time $\Delta T$ elapses.

As will be described below, the shift suppression term S has a characteristic that the currently selected gear stage Np is likely to be determined as the target gear stage Nm immediately after shifting (that is, shifting is suppressed) and the currently selected gear stage Np is less likely to be determined as the target gear stage Nm as the elapsed time T is extended.

Moreover, the shift control section 43 calculates a first multiplication value P1($=Q \cdot |Fopt (Fd)-FN (Fd)|$) by multiplying a first weighting coefficient Q by the difference absolute value $\Delta F$, calculates a second multiplication value P2 ($=R \cdot K/(\Delta T \cdot n)$) by multiplying a second weighting coefficient R by the shift suppression term S, and calculates the sum Ja ($=P1+P2$) by summing the first multiplication value P1 and the second multiplication value P2 for each of the gear stages N every time the specified time $\Delta T$ elapses.

The first weighting coefficient Q and the second weighting coefficient R are coefficients for adjusting a weighting ratio between the difference absolute value $\Delta F$ and the shift suppression term S and are common coefficients for each of the gear stages N. For example, it is set that $Q:R=\alpha:1-\alpha$ where $\alpha$ is a real number satisfying $0 \leq \alpha \leq 1$.

Every time calculating the sum Ja for each of the gear stages N (that is, every time the specified time $\Delta T$ elapses), the shift control section 43 adjusts a according to a traveling state of the vehicle, thereby adjusting the first weighting coefficient Q and the second weighting coefficient R. For example, the shift control section 43 adjusts the first weighting coefficient Q to be far larger than the second weighting coefficient R as the vehicle speed V and/or the drive power (a product of the vehicle speed V and the drive force of the drive wheel) are increased. It should be noted that, although the first weighting coefficient Q and the second weighting coefficient R are adjusted according to the traveling state of the vehicle, they may be set to desired fixed values.

The shift control section 43 determines one or more of the candidate gear stages Nc from the gear stages N on the basis of the vehicle speed V, for example. For example, the shift control section 43 determines the candidate gear stage Nc to be the gear stage N of a forward fourth gear or higher when the vehicle speed V is faster than a first vehicle speed V1, and determines the candidate gear stage Nc to be the gear stage N of a forward second gear or lower when the vehicle speed V is slower than a second vehicle speed V2 (<V1). It is desirable that the gear stage N corresponding to the currently selected gear stage Np is included in the candidate gear stages Nc.

The shift control section 43 integrates the sum Ja that is calculated every time the specified time $\Delta T$ elapses in a period from the last shift to the present time to calculate the integrated value J for each of the candidate gear stages Nc, and determines the candidate gear stage Nc in which the integrated value J is the smallest as the target gear stage Nm.

The shift control section 43 controls to shift the automatic transmission 20 to shift the currently selected gear stage Np to the target gear stage Nm when the currently selected gear stage Np is not the target gear stage Nm, and controls to shift the automatic transmission 20 to maintain the currently selected gear stage Np when the currently selected gear stage Np is the target gear stage Nm.

<Description of Operation>

Figure 2:
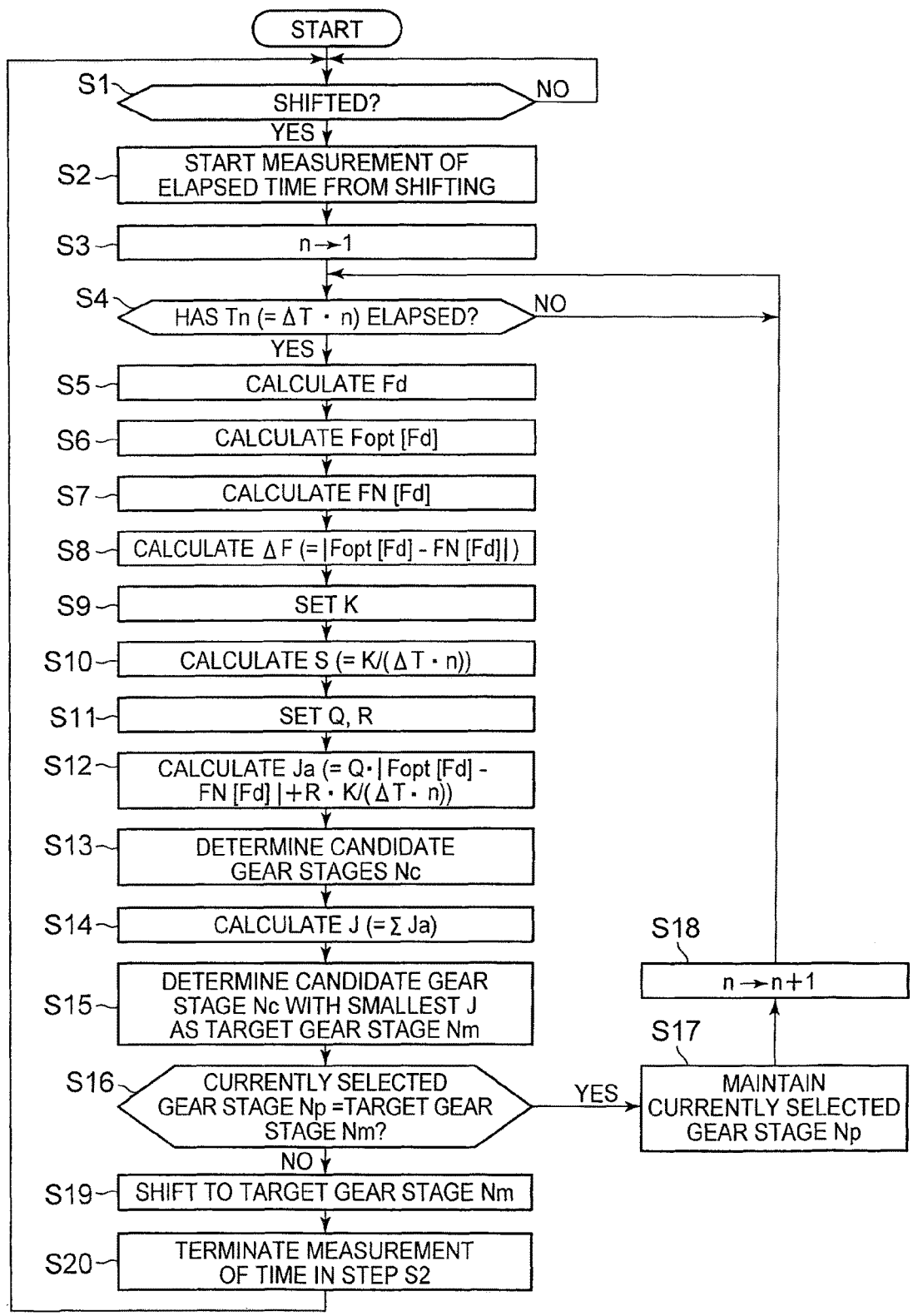
FIG. 2 is a flowchart for describing an operation of a main part of the shift control device according to the embodiment of the present invention.

Next, an operation of the main part of the shift control device 1 (a shift-related operation) will be described on the basis of FIG. 2. FIG. 2 is a flowchart for describing the operation of the main part of the shift control device according to this embodiment.

In a step S1, if the shift control section 43 shifts the currently selected gear stage Np to the different the gear stage N, a process proceeds to a step S2. If the shift control section 43 does not shift the currently selected gear stage Np to the different gear stage N, the process returns to the step S1.

In the step S2, the shift control section 43 measures the elapsed time T from the shifting in the step S1 (the last shift). Then, the process proceeds to a step S3.

In the step S3, the shift control section 43 sets n (an integer) to 1. This n is n in $\Delta T \cdot n$, which will be described below. Then, the process proceeds to a step S4.

In the step S4, the shift control section 43 determines whether or not the elapsed time T is Tn ($=\Delta T \cdot n$) or longer. The process proceeds to a step S5 if the determination result is positive (YES), and the process returns to the step S4 if the determination result is negative (No).

In the step S5, the target drive force calculation section 41 applies the accelerator operation amount PAP and the vehicle speed V to the requested drive force map that inset in advance so as to obtain the requested drive force Fd*, and calculates the target drive force Fd on the basis of the requested drive force Fd* (Fd=Fd*, for example). Then, the process proceeds to a step S6.

In the step S6, the shift control section 43 calculates the optimum fuel consumption rate Fopt [Fd] of the engine 10 for the target drive force Fd. Then, in a step S7, the shift control section 43 calculates the fuel consumption rate FN [Fd] of the engine 10 for the target drive force Fd in each of the gear stages N. In a step S8, the shift control section 43 calculates the difference absolute value $\Delta F$ ($=|Fopt [Fd]-FN [Fd]|$) between the optimum fuel consumption rate Fopt [Fd] and the fuel consumption rate FN [Fd] that are respectively calculated in the steps S6, S7 for each of the gear stages N. Then, the process proceeds to a step S9.

In the step S9, the shift control section 43 sets the shift suppression coefficient K for each of the gear stages N. In other words, the shift control section 43 sets the shift suppression coefficient K for each of the gear stages N to the first value when the gear stage corresponds to the currently selected gear stage Np, and sets the shift suppression coefficient K for each of the gear stages N to the second value that is larger than the first value when the gear stage does not correspond to the currently selected gear stage Np. Then, the process proceeds to a step S10.

In the step S10, the shift control section 43 calculates the inverse of the elapsed time T (=Tn=ΔT×n) from the shifting in the step Si (that is, the last shift). Then, the shift control section 43 uses the shift suppression coefficient K of the step S9 to multiply the shift suppression coefficient K by the inverse of the elapsed time T and calculates the shift suppression term S (=K/(ΔT×n)) for each of the gear stages N. Then, the process proceeds to a step S11.

In the step S11, the shift control section 43 adjusts the first weighting coefficient Q and the second weighting coefficient R according to the traveling state of the vehicle. Then, the process proceeds to a step S12.

In the step S12, the shift control section 43 calculates the first multiplication value P1 (=Q·|Fopt (Fd)−FN (Fd)|) by multiplying the first weighting coefficient Q in the step S11 by the difference absolute value ΔOF in the step S8, calculates the second multiplication value P2 (=R·K/(Δt·n)) by multiplying the second weighting coefficient R in the step S11 by the shift suppression term S in the step S10, and sums the first multiplication value P1 and the second multiplication value P2 to calculate the sum Ja (=P1+P2) for each of the gear stages N. Then, the process proceeds to a step S13.

In the step S13, the shift control section 43 determines one or more of the candidate gear stages Nc from each of the gear stages N on the basis of the vehicle speed V, for example. Then, the process proceeds to a step S14.

In the step S14, the shift control section 43 integrates the sum Ja that is calculated every time the process in the step S12 is executed in a period from the shifting in the step S1 to the present time (that is, every time the specified time ΔT elapses) to calculate the integrated value J for each of the candidate gear stages Nc. Then, the process proceeds to a step S15.

In the step S15, of the candidate gear stages Nc that are determined in the step S13, the shift control section 43 determines the candidate gear stage Nc in which the integrated value J of the step S14 is the smallest as the target gear stage Nm. Then, the process proceeds to a step S16.

In the step S16, the shift control section 43 determines whether or not the currently selected gear stage Np is same as the target gear stage Nm that is determined in the step S15. If the determination result is positive (Yes), the process proceeds to a step S17, and the shift control section 43 controls to shift the automatic transmission 20 and maintains the currently selected gear stage Np. Then, the process proceeds to a step S18, n (this n is n in ΔT·n described above) is changed to n+1, and the process returns to the step S4. On the other hand, if the determination result in the step S16 is negative (No), the process proceeds to a step S19, and the shift control section 43 controls to shift the automatic transmission 20 and shifts the currently selected gear stage Np to the target gear stage Nm. Then, the process proceeds to a step S20, the measurement of the time in the step S2 is terminated, and the process returns to the step S1.

In the above operation, every time a series of the processes from the step S4→ . . . S16→S17→S18→S4 is executed, the specified time ΔT elapses. Then, every time the specified time ΔT elapses, the target drive force Fd is calculated, and the sum Ja for the target drive force Fd is calculated for each of the gear stages N. In addition, every time the specified time ΔT elapses, the candidate gear stages Nc are determined, and the sum Ja that is calculated every time the specified time ΔT elapses in the period from the shifting in the step S1 (the last shift) to the present time is integrated for each of the candidate gear stages Nc to calculate the integrated value J. Then, the candidate gear stage Nc in which the integrated value J is the smallest is determined as the target gear stage Nm. If the target gear stage Nm is not the currently selected gear stage Np, the currently selected gear stage Np is shifted to the target gear stage Nm.

As described above, the candidate gear stage Nc in which the integrated value J is the smallest is determined as the target gear stage Nm. However, because the difference absolute value ΔF in the integrated value J for the candidate gear stage Nc is a difference absolute value between the optimum fuel consumption rate Fopt [Fd] and the fuel consumption rate FN [Fd] in the candidate gear stage Nc, the candidate gear stage Nc in which the fuel consumption rate FN [Fd] is close to the optimum fuel consumption rate Fopt [Fd] (that is, the excess fuel consumption rate from the optimum fuel consumption rate Fopt [Fd] is small) is more likely to be determined as the target gear stage Nm. In addition, the shift suppression term S in the integrated value J for the candidate gear stage Nc takes the first value when the candidate gear stage Nc corresponds to the currently selected gear stage Np (when the candidate gear stage Nc and the currently selected gear stage Np are identical), and takes the second value that is larger than the first value when the candidate gear stage Nc does not correspond to the currently selected gear stage Np (when the candidate gear stage Nc and the currently selected gear stage Np are not identical). Accordingly, the candidate gear stage Nc that corresponds to the currently selected gear stage Np is more likely to be determined as the target gear stage Nm.

When the second weighting coefficient R is 0, the integrated value J does not include the shift suppression term S and thus is the integrated value of the difference absolute value ΔF. In this case, the candidate gear stage Nc in which the fuel consumption rate FN [Fd] is the closest to the optimum fuel consumption rate Fopt [Fd] is determined as the target gear stage Nm (that is, the target gear stage Nm is a gear stage in which the fuel economy is only emphasized). Meanwhile, when the first weighting coefficient Q is 0, the integrated value J does not include the difference absolute value AF and thus is the integrated value of the shift suppression term S. In this case, the candidate gear stage Nc that corresponds to the currently selected gear stage Np is determined as the target gear stage Nm (that is, the target gear stage Nm is a gear stage in which the shift suppression is only emphasized). In a case other than the above, the candidate gear stage Nc having a ratio of the fuel consumption performance to a degree of the shift suppression that corresponds to a ratio of the first weighting coefficient Q to the second weighting coefficient R is determined as the target gear stage Nm.

<Primary Effects>

According to the shift control device 1 configured as above, every time the specified time ΔT elapses, the target drive force Fd is calculated, the difference absolute value ΔF between the optimum fuel consumption rate Fopt [Fd] for the target drive force Fd and the fuel consumption rate FN [Fd] for the target drive force Fd in each of the gear stages N (that is, the excess fuel consumption rate from the optimum fuel consumption rate Fopt [Fd] in each of the gear stages N) is calculated, the shift suppression term S is calculated by multiplying the shift suppression coefficient K by the inverse of the elapsed time T from the last shift, the first multiplication value P1 is calculated by multiplying the first weighting coefficient Q by the difference absolute value ΔF for each of the gear stages N, the second multiplication value P2 is calculated by multiplying the second weighting coefficient R by the shift suppression term S, the sum Ja of the first multiplication value P1 and the second multiplication value P2 is calculated, the candidate gear stages Nc are determined from the gear stages N, the sum Ja that is calculated in the period from the last shift to the present time is integrated for each of the candidate gear stages Nc (the integrated value J), and the candidate gear stage in which the integrated value J is the smallest (that is, the candidate gear stage in which the integrated value of the excess fuel consumption rate is the smallest) Nc is determined as the target gear stage Nm.

As described above, not only the current difference absolute value (corresponding to the hypothetical fuel consumption rate of related art) ΔF, but the integrated value J in which the difference absolute values ΔF calculated in the period from the last shift to the present time are considered. Accordingly, when the accelerator operation amount is temporarily increased to the large value (that is, when the accelerator operation amount immediately returns to the original value), the integrated value J is not substantially changed. Thus, the target gear stage Nm in this case (when the accelerator operation amount is temporarily increased to the large value) is likely to become the same gear stage as the target gear stage Nm before the accelerator operation amount is temporarily increased to the large value. This can suppress degradation of the fuel consumption rate when the accelerator operation amount returns to the original value. Therefore, even when the accelerator operation amount is temporarily and substantially changed, the favorable fuel consumption performance can be maintained.

In addition, the shift suppression coefficient K for each of the gear stages N takes the first value when the gear stage N corresponds to the currently selected gear stage Np, and takes the second value that is larger than the first value when the gear stage N does not correspond to the currently selected gear stage Np. Accordingly, the shift suppression term S for the currently selected gear stage Np is smaller than the shift suppression terms S for the gear stages N other than the currently selected gear stage Np. Thus, the integrated value J for the currently selected gear stage Np is likely to be the smallest, and the currently selected gear stage Np is likely to be determined as the target gear stage Nm (that is, shifting is suppressed).

It should be noted that the suppression of shifting does not inhibit shifting, but rather, tends to prevent easy shifting. Thus, compared to the related art that inhibits shifting for a specified period from the last shift, it is possible to suppress degradation of drivability.

Furthermore, because the shift suppression term S for each of the gear stages N is reduced along with the elapsed time T from the last shift, the tendency of the currently selected gear stage Np to be determined as the target gear stage Nm (that is, the suppression of shifting) is lowered. Accordingly, it is possible to suppress frequent shifting immediately after shifting and is also possible to achieve a feeling of acceleration in a sport drive mode.

The first multiplication value P1 is calculated by multiplying the first weighting coefficient Q by the difference absolute value ΔF, and the second multiplication value P2 is calculated by multiplying the second weighting coefficient R by the shift suppression term S. By appropriately adjusting a magnitude relationship between the first weighting coefficient Q and the second weighting coefficient R, the difference absolute value ΔF (that is, the fuel economy) can be emphasized or the shift suppression term S (that is, suppression of the frequent shifting and the feeling of acceleration) can be emphasized when the target gear stage Nm is determined.

Because each of the first weighting coefficient Q and the second weighting coefficient R depends on at least one of the vehicle speed V and the drive power (the product of the vehicle speed V and the drive force of the drive wheel) (that is, the traveling state of the vehicle), it is possible to adjust the magnitude relationship between the first weighting coefficient Q and the second weighting coefficient R according to the traveling state of the vehicle.

As the drive power is increased, the second weighting coefficient R becomes larger than the first weighting coefficient Q. In other words, in a range where the drive power is large, it can be determined that the vehicle travels in the sport drive mode rather than in a fuel economy drive mode. Thus, in this case, the suppression of the frequent shifting and the feeling of acceleration can be more emphasized than the fuel economy. On the other hand, in a range where the drive power is small, it can be determined that the vehicle travels in the fuel economy drive mode rather than in the sport drive mode. Thus, in this case, the fuel economy can be more emphasized than the suppression of the frequent shifting and the feeling of acceleration.

<Supplementary Items>

The description has been made so far on the preferred embodiment of the present invention with reference to the accompanying drawings. However, it is needless to say that the present invention is not limited thereto. It is apparent that those skilled in the art can easily arrive at various modifications or changes within the scope of claims, and it is understood that these modifications or changes are naturally included in the technical scope of the present invention.

The present invention is particularly effective when it is applied to a shift control device for controlling an automatic transmission that automatically shifts a rotary drive force output from an engine.

What is claimed is:

1. A shift control device comprising:
an electronic control unit configured to:
(a) determine a target gear stage;
(b) set a gear stage out of a plurality of gear stages of an automatic transmission that automatically shifts a rotational speed of an engine to the target gear stage;
(c) calculate a target drive force every time a specified time elapses;
(d) calculate an absolute value of a difference between an optimum fuel consumption rate for the target drive force and a fuel consumption rate for the target drive force in each of the gear stages;
(e) determine candidate gear stages from the gear stages;
(f) integrate the absolute value that is calculated for each of the candidate gear stages in a period from a last shift to the present time to calculate an integrated value; and
(g) determine the candidate gear stage for which the integrated value is the smallest as the target gear stage.

2. The shift control device according to claim 1, wherein the electronic control unit sets a shift suppression coefficient for each of the gear stages,
the electronic control unit sets the shift suppression coefficient for each of the gear stages to a first value when the set gear stage and a currently selected gear stage of the plurality of gear stages are identical, and sets the shift suppression coefficient for each of the gear stages to a second value that is larger than the first value when the set gear stage and the currently selected gear stage are not identical,
the electronic control unit calculates a shift suppression term by multiplying the shift suppression coefficient by an inverse of an elapsed time from the last shift, the electronic control unit calculates a first multiplication value by multiplying a first weighting coefficient by the absolute value, the electronic control unit multiplies a second weighting coefficient by the shift suppression term and calculates a second multiplication value, and calculates a sum of the first multiplication value and the second multiplication value for each of the gear stages every time the specified time elapses, the electronic control unit integrates the sum that is calculated for each of the candidate gear stages in the period from the last shift to the present time to calculate the integrated value, and the electronic control unit determines the candidate gear stage for which the integrated value is the smallest as the target gear stage.

3. The shift control device according to claim 2, wherein the electronic control unit sets such that each of the first weighting coefficient and the second weighting coefficient depends on at least one of a vehicle speed and drive power.

4. The shift control device according to claim 2, wherein the electronic control unit sets such that the second weighting coefficient becomes larger than the first weighting coefficient as drive power is larger.

5. A method of controlling a shift control device that includes an electronic control unit, the method comprising:

determining a target gear stage by the electronic control unit;

setting a gear stage out of a plurality of gear stages of an automatic transmission that automatically shifts a rotational speed of an engine to the target gear stage by the electronic control unit;

calculating a target drive force by the electronic control unit every time a specified time elapses;

calculating an absolute value of a difference between an optimum fuel consumption rate for the target drive force and a fuel consumption rate for the target drive force in each of the gear stages by the electronic control unit, determining candidate gear stages from the gear stages by the electronic control unit, integrating the absolute value that is calculated for each of the candidate gear stages in a period from a last shift to the present time to calculate an integrated value by the electronic control unit, and determining the candidate gear stage for which the integrated value is the smallest as the target gear stage by the electronic control unit.

* * * * *